(12) United States Patent
Bauer

(10) Patent No.: US 12,726,024 B2
(45) Date of Patent: Sep. 1, 2026

(54) METHOD AND SYSTEM FOR A NETWORK DISTRIBUTING ELECTRICITY

(71) Applicant: Alberto Bauer, Al Menara (AE)

(72) Inventor: Alberto Bauer, Al Menara (AE)

( * ) Notice: Subject to any disclaimer, the term of this patent is extended or adjusted under 35 U.S.C. 154(b) by 355 days.

(21) Appl. No.: 18/687,901

(22) PCT Filed: Sep. 15, 2022

(86) PCT No.: PCT/IT2022/000047
§ 371 (c)(1),
(2) Date: Feb. 29, 2024

(87) PCT Pub. No.: WO2023/047425
PCT Pub. Date: Mar. 30, 2023

(65) Prior Publication Data

US 2025/0141227 A1 May 1, 2025

(30) Foreign Application Priority Data

Sep. 24, 2021 (IT) ........................ 102021000024530

(51) Int. Cl.

| | |
|---|---|
| ***H02J 3/0012*** | (2026.01) |
| ***G01R 31/08*** | (2020.01) |
| ***G06F 19/00*** | (2018.01) |
| ***H02J 13/12*** | (2026.01) |

(52) U.S. Cl.
CPC ............ *H02J 3/0012* (2020.01); *H02J 13/12* (2026.01)

(58) Field of Classification Search
CPC .. H02J 3/00; H02J 13/00; G01R 31/08; G06F 19/00
See application file for complete search history.

(56) References Cited

U.S. PATENT DOCUMENTS

| | | | | |
|---|---|---|---|---|
| 11,211,796 | B2 | 12/2021 | Metcalfe | |
| 2003/0120440 | A1 * | 6/2003 | Zima | H02H 7/22 702/57 |
| 2018/0097363 | A1 | 4/2018 | Blood | |

* cited by examiner

*Primary Examiner* — Neel D Shah
(74) *Attorney, Agent, or Firm* — Andrew Wilford

(57) ABSTRACT

A method relating to a grid for the distribution of electricity comprises a primary substation CP and at least one secondary substation CS.100/CS.200/CS.300. By means of said system the following operations are carried out: 1a)_to detect by means of a PMU 17 the values of the current at the beginning of a first line L1.MT by means of a current transformer 16; 1b)_to detect by means of a PMU 17 the voltage values at the output of a measurement voltage transformer 15; 1c)_to detect by means of a PMU 151/251/351 the voltage values at the output of at least one voltage reduction apparatus (120/130/230/330). A system to implement the same method.

16 Claims, 2 Drawing Sheets

CP
CS100
CS200
CS300
L1.MT
L2.MT
L3.MT
L4.MT
11
12
13
14
110
120
130
140
210
230
240
310
320
340

CS300
L1.MT
320
310
340
PMU
351
CS200
230
210
240
PMU
251
CS100
120
110
130
140
PMU
151
CP
L4.MT
L3.MT
L2.MT
L1.MT
14
16
13
12
11
15
17
PMU
UR

METHOD AND SYSTEM FOR A NETWORK DISTRIBUTING ELECTRICITY

CROSS REFERENCE TO RELATED APPLICATIONS

This application is the US-national stage of PCT application PCT/IT2022/000047 filed 15 Sep. 2022 and claiming the priority of Italian patent application 102020000024530 itself filed 24 Sep. 2021.

TECHNICAL FIELD

The present invention regards the sector of grid for the distribution of electrical energy and, more particularly, in the sector of diagnostics for said grid.

BACKGROUND OF THE INVENTION

At present, methods and systems relating to grids for the distribution of electricity are known.

These methods and systems have a series of drawbacks. A first drawback is due to the fact that they do not allow to perform an accurate diagnostics in relation to the grid as a whole and/or in relation to pieces of the same distribution grid and/or in relation to one or more of the devices to it connected, such as, for example, to perform a calibration of the voltage reduction devices during the operation of the grid and therefore with the grid energized. A second drawback is due to the fact that they require the use in the grid of multiple devices and multiple apparatus with consequent set up costs and maintenance costs. A third drawback is due to the fact that they do not allow a modification of existing grid systems, in which it is not possible to carry out the diagnostics of the devices, in grid systems in which it is possible to carry out the diagnostics of the pre-existing grid and/or of the related apparatus already present, such as, for example, obtaining a grid in which it is possible to perform the calibration of the voltage reduction apparatuses, without, for example, having to install voltage transformers in the secondary substations.

DESCRIPTION OF THE INVENTION

The purpose of the present invention is therefore to solve the aforementioned drawbacks.

The invention, which is characterized by the claims, solves the problem of creating a method relating to a grid for the distribution of electrical energy comprising a primary substation and at least one secondary substation; wherein said primary substation comprises a first high voltage conductor, a HV/MV voltage transformer suitable for transforming the high voltage electrical energy coming from said first conductor into medium voltage electrical energy, a second medium voltage conductor as output conductor from said HV/MV voltage transformer, a medium voltage busbar connected to said second medium voltage conductor, one or more medium voltage power distribution lines as output lines from said primary substation and connected to said medium voltage busbar, a voltage measurement transformer connected to the second conductor and suitable to measure the output voltage from said HV/MV voltage transformer, a first current transformer connected to the first line of medium voltage in an initial zone of the same first line and able to detect the current at the beginning of the aforementioned first line of medium voltage, a first PMU connected to the output of the aforementioned measurement voltage transformer and connected to the output of the said current transformer; In which said secondary substation comprises at least one third conductor in medium voltage as input conductor in the secondary substation and connected to said first line of said medium voltage power distribution lines, at least one voltage reduction apparatus connected to said third medium voltage input conductor, a second PMU connected to the output of at least one voltage reduction apparatus located in said secondary substation; in which said system comprises a receiving_processing unit able to receive and process the data transmitted by the first PMU located in the primary substation and the data transmitted by the second PMU located in the secondary substation; wherein said method is characterized by the fact to comprises the following operations: m.1a)_to detect by means of the first PMU located in the primary substation and at certain instants of time the values of the current present at the beginning of the aforementioned first line by means of the first current transformer located in said primary substation and transmitting the relative data with relative time references to the receiving processing unit; m. 1b)_to detect by means of the first PMU located in the primary substation and at certain instants of time which are same instant of time of the previous point m.1a) the voltage values at the output of the voltage measurement transformer located in the same primary substation and transmitting the relative data with relative instant of time to the receiving_processing unit; m.1c)_to detect by means of the second PMU located in said secondary substation and at certain instants of time which are the same instants of time of the previous point m.1a) and of the previous point m.1b) the voltage values at the output from said at least one voltage reduction apparatus located in said secondary substation and transmit the relative data with relative instants of time to the receiving_processing unit; m.1d)_to identify and to select by said receiving_processing unit among the data received by the previous operation m.1a) at least a first instant in time in which the value of the current relative to the first line detected by the current transformer located in the primary substation is lower than a certain first predetermined threshold value; m.1e)_to process by means of said receiving_processing unit one or more data received by the same receiving_processing unit by the previous operations m.1a) and/or m.1b) and/or m.1c) and regarding said first instant in time.

The invention, which is characterized by the claims, solves the problem of creating a system relating to a grid for the distribution of electrical energy comprising a primary substation and at least one secondary substation, wherein said primary substation comprises a first high voltage conductor, a HV/MV voltage transformer suitable to transform the high voltage electrical energy coming from said first conductor into medium voltage electrical energy, a second medium voltage conductor as output conductor from said HV/MV voltage transformer, a medium voltage busbar connected to said medium voltage conductor, one or more medium voltage electrical distribution lines connected to said medium voltage busbar such as output lines from said primary substation; In which said secondary substation comprises at least a third medium voltage input conductor connected to a first line of said electrical distribution lines of medium voltage, at least one voltage reduction apparatus connected to said at least third medium voltage input conductor; wherein said system is characterized by the fact that said primary substation comprises a voltage measurement transformer connected to the second conductor at the output of said HV/MV voltage transformer and able to measure the voltage at the output of said voltage transformer AT/MT, a first current transformer connected to the aforementioned first line of medium voltage in an initial area of the same first line and able to detect the current at the beginning of the aforementioned first line of medium voltage and a first PMU connected to the output of said measurement voltage transformer and connected to the output of the aforementioned current transformer; by the fact that said at least one secondary substation comprises a second PMU connected to the output of said at least one voltage reduction apparatus located in said secondary substation; by the fact that to comprises a receiving_processing unit able to receive and process the data transmitted by the first PMU located in the primary substation and the data transmitted by the second PMU located in the secondary substation; by the fact that said system is configured to perform the following operations: s.1a)_by means of the first PMU to detect in the primary substation and at certain instant of time the values of the current present at the beginning of the aforementioned first line by means of the first current transformer located in the same primary substation and transmitting the relative data with the relative instant of time to the receiving_processing unit; s.1b)_by means of the first PMU to detect in the primary substation and in certain temporal instants which are the same instants of time of the previous point s.1a) the voltage values at the output of the measurement voltage transformer located in the same primary substation and transmitting the relative data with relative time references to the receiving_processing unit; s.1c)_by means of the second PMU to detect in the aforementioned secondary substation and in certain instants of time which are the same instants of time of the previous point s.1a) and of the previous point s.1b) the values of the output voltage from said at least one voltage reduction apparatus located in said secondary substation and transmit the relative data with relative time references to the receiving_processing unit; s.1d)_by means of said receiving_processing unit identify and select from the received data at least a first instant in time in which the value of the current relating to the first line detected by the current transformer located in the primary substation is lower than a certain first pre-established threshold value; s.1e) by means of said receiving_processing unit to process one or more data received by the same receiving_processing unit by the previous operations s.1a) and/or s.1b) and/or s.1c) and relating to said first instant in time.

BRIEF DESCRIPTION OF THE DRAWINGS

Further characteristics and advantages of the present invention will be more evident from the following description of some of its preferred practical embodiments, given here purely by way of non-limiting example, made with reference to the figures of the attached drawings in which.

PREFERRED MANNER OF IMPLEMENTING THE INVENTION

Premises

With reference to the description of the method and of the system below, the devices identified as "PMU", ref. 17, 151, 251, 351, are known devices whose technical name in English, not yet clear as a translation into Italian, would be "Phasor_Measurement_Units" (acronym PMU).

These PMU are devices that using a common time source for synchronization and measure and/or detect voltage phasors data/values and/or measure and/or detect current data/phasors and/or other parameters, to then transmit the data/values relating to the measurements and/or surveys performed, in technical terms the "phasors", for example relating to the voltage and/or current at nominal grid frequency (for example 50 Hz or 60 Hz), with associated date and time, with a very high temporal resolution, up to 120 measurements per second and with a temporal resolution of the order of tens of nanoseconds.

Therefore, with reference to the description and the claims, the term "data" must be understood as data of any kind and, therefore, also the data that can be collected and transmitted by the aforementioned PMU and in particular (but not exclusively) the so-called "phasors".

In this context, in relation to the protection conferred by the present invention, it means that in relation to the said one or more "PMU", this unit can also be replaced with other means able to perform the same function with respect to the function that will be described in the description, without departing from the inventive concepts protected by the present invention.

Always with reference to the descriptions below relating to the method and the system, and always in relation to the protection conferred by this invention, it is understood that in relation to the device "receiving_processing unit", ref. UR, said device may also be replaced by other means capable of performing the same function as specified in the description, without departing from the inventive concepts protected by the present invention.

Figure 2:
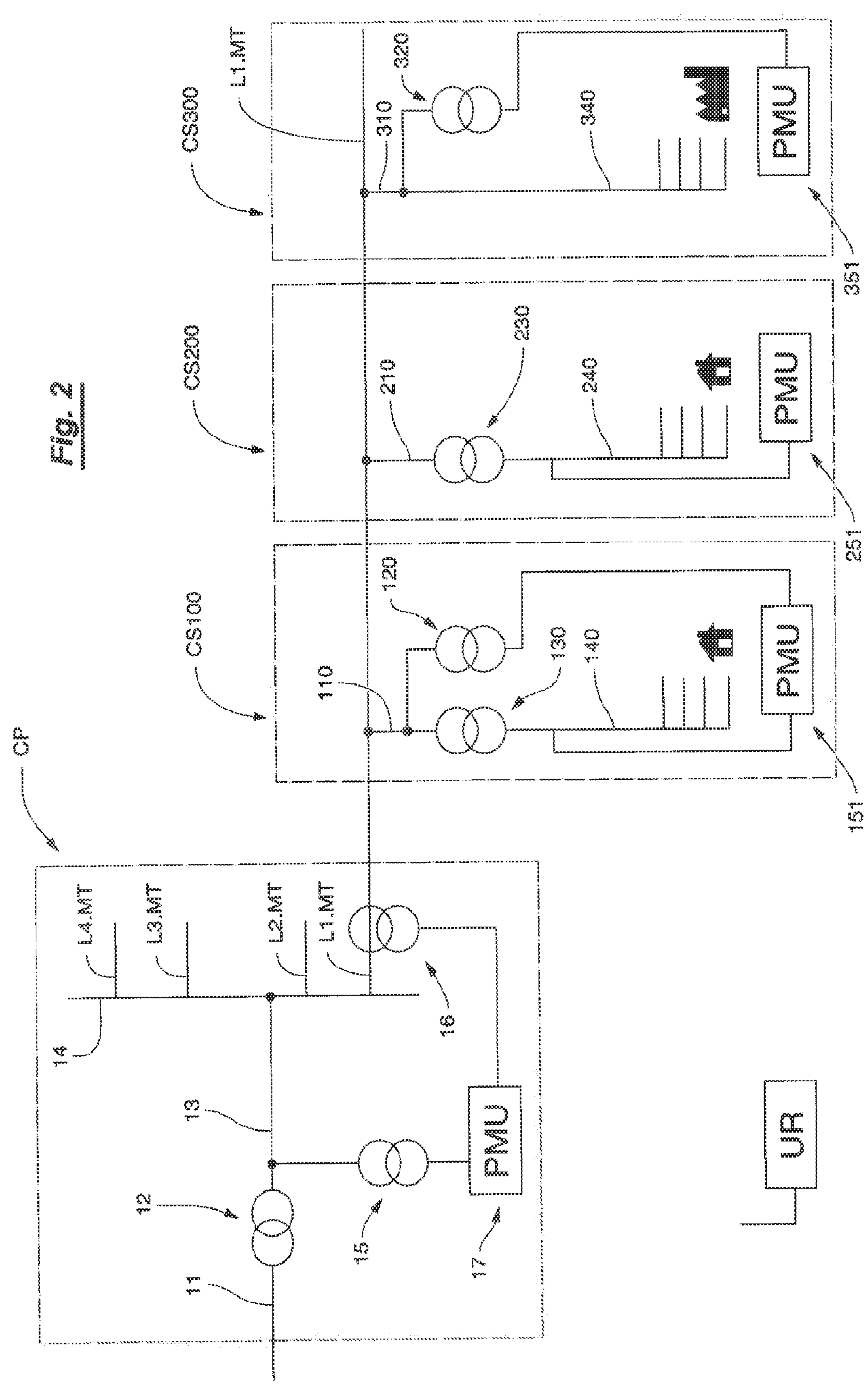
FIG. 2 illustrates schematically the method and system object of the present invention.

Method Description—FIG. 2

With reference to FIG. 2, the method object of the present invention is preferably applied in a grid for the distribution of electrical energy comprising a primary substation CP and at least one secondary substation, in which the secondary substation can have a configuration as described in relation to one of the secondary substations CS.100 or CS.200 or CS.300, or other similar configuration, or in a grid comprising the primary substation CP and a plurality of secondary substations, as will be better understood below.

With reference to FIG. 2, the primary substation CP comprises: a high voltage conductor 11; an HV/MV voltage transformer 12 adapted to transform the high voltage electrical energy coming from said conductor 11 into medium voltage electrical energy;

a medium voltage conductor 13 as output conductor from said HV/MV voltage transformer 12; a medium voltage busbar 14 connected to said medium voltage conductor 13; one or more medium voltage power distribution lines L1.MT L2.MT L3.MT L4.MT connected to said medium voltage busbar 14, such as output lines from said primary substation CP; a voltage measurement transformer 15 connected to the output conductor 13 of said HV/MV voltage transformer 12 and adapted to measure the output voltage of said HV/MV voltage transformer 12; a first current transformer 16 connected to the aforementioned first medium voltage line L1.MT in an initial zone of the same first line L1.MT and adapted to detect the current at the beginning of the aforementioned first medium voltage line L1.MT; a respective first PMU 17 connected to the output of the aforementioned measurement voltage transformer 15 and connected to the output of the aforementioned current transformer 16.

Again with reference to FIG. 2, the secondary substation CS.100/CS.200/CS.300 comprises: at least one medium voltage input conductor 110/210/310 connected to a first line L1.MT of said electrical distribution lines medium voltage L1.MT, L2.MT, etc; at least one voltage reduction apparatus 120/130/230/320 connected to said at least one medium voltage input conductor 110/210/310; at least one respective PMU 151/251/351 connected to the output of at least one voltage reduction apparatus 130/120/230/320 located in said secondary substation CS.100/CS.200/CS.300. With reference to the exemplificative embodiment illustrated in FIG. 2, therefore without limited intentions, the secondary substation CS.100 comprises: a medium voltage substation input conductor 110 connected to a first line L1.MT of said medium voltage electrical distribution lines L1.MT, L2.MT, etc.; a capacitive insulator for voltage presence 120 connected to said medium voltage input conductor 110; a MV/LV voltage transformer 130, adapted to transform the electrical energy supplied by said medium voltage input conductor 110 into low voltage electrical energy; an output conductor 140 from said MV/LV voltage transformer 130 and suitable for transporting and supplying low voltage electrical energy to users, such as for example to residential buildings, and a PMU 151 connected to the output of said capacitive insulator voltage presence 120 and connected to the output of the MV/LV voltage transformer 130.

Again with reference to the exemplificative embodiment illustrated in FIG. 2, therefore without limited intentions, the secondary substation CS.200 comprises: a medium voltage substation input conductor 210 connected to a first line L1.MT of said medium voltage power distribution lines L1.MT, L2.MT, etc.; a MV/LV voltage transformer 230, able to transform the electrical energy supplied by said medium voltage input conductor 210 into low voltage electrical energy; an output conductor 240 from said MV/LV voltage transformer 230 and able to supply with low voltage users, such as, for example, residential homes; and a PMU 251 connected to the output of said MV/LV 230 voltage transformer.

Again with reference to the exemplificative embodiment illustrated in FIG. 2, there-fore without limited intentions, the secondary substation CS.300 comprises: a medium voltage substation input conductor 310 connected to a first line L1.MT of said medium voltage electrical distribution lines L1.MT, L2.MT, etc.; a capacitive insulator for voltage presence 320 connected to said medium voltage input conductor 310; an output conductor 340 connected to conductor 310 and adapted to supply medium voltage to users, such as for example factories; and a PMU 351 connected to the output of said capacitive voltage presence insulator 320.

Furthermore, again with reference to the same FIG. 2, the illustrated system also comprises a receiving_processing unit UR suitable for receiving and processing the data transmitted by the first PMU 17 located in the primary substation CP and the data transmitted by at least one PMU 151/251/351 located in the secondary substation CS.100/CS.200/CS.300.

With reference to the system described above, the the object of the present invention comprises the following operations: m.1a)_to detect by means of the first PMU 17 located in the primary substation CP and at certain instants of time the values of the current present at the beginning of the aforementioned first line L1.MT by means of the first current transformer 16 located in said primary substation CP and transmitting the relative data with relative time references to the receiving processing unit UR; m.1b)_to detect by means of the first PMU 17 located in the primary substation CP and at certain instants of time which are same instant of time of the previous point m.1a) the voltage values at the output of the measurement 15 located in the same primary substation CP and transmitting the relative data with relative instant of time to the receiving_processing unit UR; m.1c)_to detect by means of at least one of the PMU 151/251/351 located in at least one of said secondary substation CS.100/CS.200/CS.300 and at certain instants of time which are the same instants of time of the previous point m.1a) of the previous point m.1b) the voltage values at the output from said at least one voltage reduction apparatus 120/130/230/320 located in one of said secondary substation CS.100/CS.200/CS.300 and connected to said at least one PMU 151/251/351 and transmit the relative data with relative instants of time to the receiving_processing unit UR; m.1d)_to identify and to select by said receiving_processing unit UR among the data received by the aforementioned operation m.1a) at least a first instant in time in which the value of the current relative to the first line L1.MT detected by the current transformer 16 located in the primary substation CP is lower than a certain first predetermined threshold value; m.1e)_to processing by means of said receiving_processing unit UR one or more data received by the same receiving_processing unit UR by the aforementioned operation m.1a) and/or m.1b) and/or m.1c) and regarding said first instant in time.

Again with reference to the system described above, the object of the present invention may comprise the following operations: m.2a)_to store by receiving_processing unit UR the data transmitted by the first PMU 17 located in the primary substation CP and transmitted by the second PMU 151/251/351 located in the respective secondary substation CS.100 and/or CS.200 and/or CS.300; m.2b)_to identify and to select by means of said receiving_processing unit UR among the received data at least a first instant in time in which the value of the current relative to the first line L1.MT detected by the current transformer 16 located in the primary substation CP is lower than a first predetermined threshold value; m.2c)_to identify by means of said receiving_processing unit UR, among the received data, the data relating to the output voltage with respect to the voltage measurement transformer 15 located in said primary substation CP in the same identified and selected first instant of time of the above point m.2b); m.2d)_to identify by means of said receiving_processing unit UR, among the received data, the data relating to the output voltage with respect to said at least one voltage reduction apparatus 120/130/230/320 located in the secondary substation CS.100/CS.200/CS.300 in the same identifies and selected first instant of time of the above point m.2b); m.2e)_to process the data identified in the above point m.2c) and point m.2d) regarding said first instant of time.

According to a preferred embodiment, the method object of the present invention also includes the following operation: m.2f)_to process the data identified in the aforementioned point m.2c) and in point m.2d) regarding said first instant of time in order to perform a calibration in relation to said at least one voltage reduction apparatus 120/130/230/320 located in the secondary substation CS.100/CS.200/CS.300.

The method object of the present invention can also further comprise the following operation: m.2g)_to perform a comparison between at least a first value regarding the output voltage from at least one voltage reduction apparatus, 120 and/or 130 and/o 230 and/or 320 located in at least one secondary substation CS.100 and/or CS.200 and/or CS.300 with at least a second value relating to the output voltage from the voltage measurement transformer 15 located in the primary substation CP, in which said first value and said second value regard the same instant of time, as for example in the above mentioned first instant of time (see operation m.1d) signified above).

Still the method object of the present invention can also further comprise the following operation: m.3a)_to process the data received from the receiving_processing unit UR to carry out a diagnosis of the distribution grid and/or of pieces of the same distribution grid and/or of one or more of the devices connected to it.

With reference to the first predetermined threshold value mentioned in the specification, see in particular aforementioned points m.1d) and m.2b) relating to the current transformer 16, it is preferably equal to zero, or, always preferably, a value such as to have an effect due to the voltage drop on the line due to the current flowing in the line itself having a negligible entity. This current value can for example be determined on the basis of the length of the first line L1.MT.

Example of Implementation of the Method In Relation to the Voltage Reduction Apparatus 130

With reference to the method described above, by way of example, hereinafter is described an example of application of the method in relation to the voltage reduction apparatus 130 (MV/LV voltage transformer 130) located in the secondary substation CS.100.

In this context, it should be noted that the same method specified below can also be used in relation to the other 120/230/320 voltage reduction devices located in the same secondary substation CS.100 and/or located in the other secondary substation CS.200 and CS.300 and/or located in other substations if existing.

With reference to the primary substation CP and to the secondary substation CS.100, for the implementation of this example of method, proceed as follows: e.m.1a)_to detect by means of the first PMU 17 located in the primary substation CP and at certain instants of time the values of the current present at the beginning of the aforementioned first line L1.MT by means of the first current transformer 16 located in said primary substation CP and transmitting the relative data with relative time references to the receiving processing unit UR; e.m.1b)_to detect by means of the first PMU 17 located in the primary substation CP and at certain instants of time which are same instant of time of the previous point e.m.1a) the voltage values at the output of the measurement voltage transformer 15 located in the same primary substation CP and transmitting the relative data with relative instant of time to the receiving_processing unit UR; e.m.1c)_to detect by means of the second PMU 151 located in said secondary substation CS.100 and at certain instants of time which are the same instants of time of the previous point e.m.1a) and of the previous point e.m.1b) the voltage values at the output from said at least one voltage reduction apparatus 130 located in said secondary substation CS.100 and transmit the relative data with relative instants of time to the receiving_processing unit UR; e.m.2a)_to store by receiving_processing unit UR the data transmitted by the first PMU 17 located in the primary substation CP and transmitted by the second PMU 151 located in the secondary substation CS.100; e.m.2b)_to identify and to select by means of said receiving_processing unit UR among the received data at least a first instant in time in which the value of the current relative to the first line L1.MT detected by the current transformer 16 located in the primary substation CP is lower than a first predetermined threshold value; e.m.2c)_to identify by means of said receiving_processing unit UR, among the received data, the data relating to the output voltage with respect to the voltage measurement transformer 15 located in said primary substation CP in the same first instant of time identified and selected of the above point e.m.2b); e.m.2d)_to identify by means of said receiving_processing unit UR, among the received data, the data relating to the output voltage with respect to said at least one voltage reduction apparatus 130 located in the secondary substation CS.100 in the same first instant of time identifies and selected by the above point e.m.2b); m.2e)_to process by means of the receiving_processing unit UR the data identified in the above point e.m.2c) and point e.m.2d) regarding said first instant of time.

With reference to the procedure described above, it is also possible to proceed with the following operation: e.m.2f)_to process by the receiving_processing unit UR the data identified by previous point e.m.2c) and point e.m.2d) regarding said first instant of time in order to perform a calibration in relation to said voltage reduction apparatus 130 located in the secondary substation CS.100; and/or preferably proceed with the following operation: e.m.2g)_to perform by means of the receiving_processing unit UR a comparison between at least a first value regarding to the output voltage from at least one voltage reduction apparatus 130 located in at least one secondary substation CS.100 with at least a second value relating to the output voltage from the voltage measurement transformer 15 located in the primary substation CP, in which said first value and said second value are relating to the same instant in time, as for example in the aforementioned first instant in time.

If desired, the following operation can also be further comprises: e.m.3a)_to process by means of the receiving_processing unit UR the data received from the receiving_processing unit UR to perform a diagnosis of the voltage reduction apparatus 130.

Figure 1:
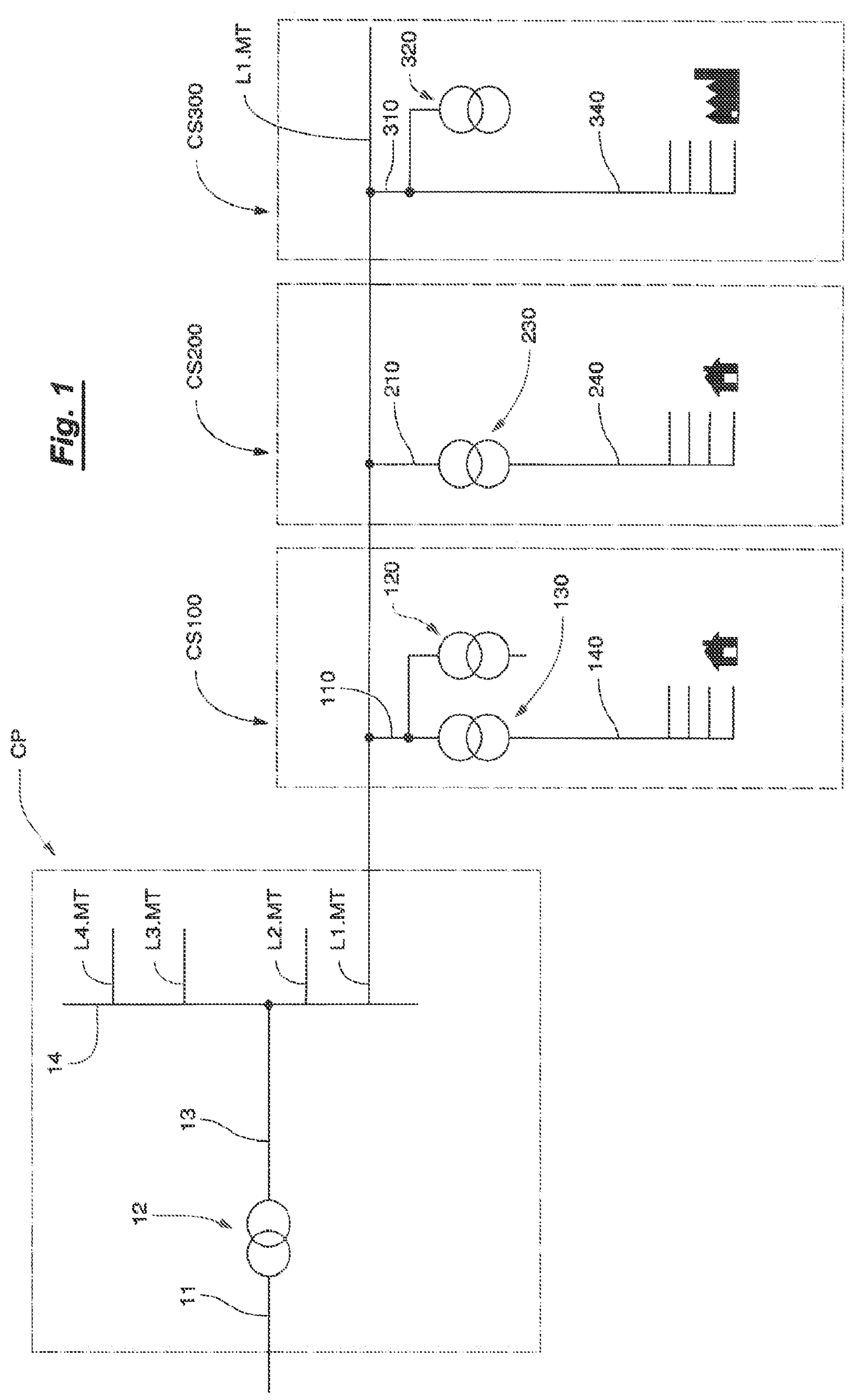
FIG. 1 illustrates schematically a possible pre-existing system for the distribution of electrical energy.

System Description—FIGS. 1 and 2

With reference to the exemplificative embodiment illustrated in FIG. 2, the present invention relates to a system relating to a grid for the distribution of electricity, in which, for example, said system can also be used to modify a pre-existing system or a portion of a pre-existing system, such as, for example, the pre-existing system illustrated in FIG. 1, in which, for the implementation of the system object of the present invention, there is at least one of the secondary substations CS.100/CS.200/CS.300, and in which the implementation of the system object of the present invention takes place by integrating some components in the primary substation CP of FIG. 1 and/or by integrating some components in at least one of the secondary substations CS.100, CS.200, CS.300 of the same FIG. 1, as can be better understood afterwards.

With reference to FIG. 2, the system object of the present invention can comprise a primary substation CP and at least one secondary substation, CS.100 or CS.200 or CS.300, as specified hereinafter.

With reference to a pre-existing system, see FIG. 1, the primary substation CP comprises: a high voltage conductor 11; an HV/MV voltage transformer 12, suitable for transforming the high voltage electrical energy coming from said conductor 11 into medium voltage electrical energy; a medium voltage conductor 13 as an output conductor from said HV/MV voltage transformer 12; a medium voltage busbar 14 connected to said medium voltage conductor 13; one or more medium voltage power distribution lines, L1.MT, L2.MT, L3.MT, L4.MT, connected to said medium voltage busbar 14, output from said primary substation CP.

With reference to a pre-existing system, see FIG. 1, the secondary substation CS.100 or CS.200 or CS.300 comprises: at least one medium voltage input conductor 110/210/310 connected to a first line L1.MT of said medium voltage power distribution lines L1.MT, L2.MT, etc.; at least one voltage reduction apparatus 120/130/230/320 connected to said at least one medium voltage input conductor 110/210/310.

With reference to the pre-existing system of FIG. 1 and with reference to FIG. 2, the system object of the present invention, in the aforementioned primary substation CP, as additional components, comprises: a voltage measurement transformer 15 connected to the output conductor 13 of said HV/MV voltage transformer 12 and able to measure the output voltage from said HV/MV voltage transformer 12; a first current transformer 16 connected to the aforementioned first medium voltage line L1.MT in an initial zone of the same first line L1.MT and able to detect the current at the beginning of the aforementioned first medium voltage line L1.MT; a respective first PMU 17 connected to the output of the aforementioned measurement voltage transformer 15 and connected to the output of the aforementioned current transformer 16.

With reference to the pre-existing system of FIG. 1 and with reference to FIGS. 2, the system object of the present invention, in the secondary substation CS. 100 or CS.200 or CS.300, as additional components, comprises: a second PMU 151/251/351 connected to the output of at least one voltage reduction apparatus 130/120/230/320 located in said secondary substation CS.100 or CS.200 or CS.300.

With reference to the exemplificative embodiment illustrated in FIG. 2, therefore without limited intentions, the secondary substation CS.100 comprises: a medium voltage substation input conductor 110 connected to a first line L1.MT of said medium voltage electrical distribution lines L1.MT, L2.MT, etc.; a capacitive insulator for voltage presence 120 connected to said medium voltage input conductor 110; a MV/LV voltage transformer 130, able to transform the electrical energy supplied by said medium voltage input conductor 110 into low voltage electrical energy; an output conductor 140 from said MV/LV voltage transformer 130 and suitable for transporting and supplying low voltage electrical energy to users such as for example to residential buildings, and a PMU 151 connected to the output of said capacitive insulator for voltage presence 120 and connected to the output of the MV/LV voltage transformer 130.

Again with reference to the exemplificative embodiment illustrated in FIG. 2, therefore without limited intentions, the secondary substation CS.200 comprises: a medium voltage substation input conductor 210 connected to a first line L1.MT of said medium voltage power distribution lines L1.MT, L2.MT, etc.; a MV/LV voltage transformer 230, able to transform the electrical energy supplied by said medium voltage input conductor 210 into low voltage electrical energy; an output conductor 240 from said MV/LV voltage transformer 230 and suitable for supplying low voltage users, such as for example to residential homes; and a PMU 251 connected to the output of said MV/LV 230 voltage transformer.

Again with reference to the exemplificative embodiment illustrated in FIG. 2, therefore without limited intentions, the secondary substation CS.300 comprises: a medium voltage substation input conductor 310 connected to a first line L1.MT of said medium voltage electrical distribution lines L1.MT, L2.MT, etc.; a capacitive insulator for voltage presence 320 connected to said medium voltage input conductor 310; an output conductor 340 connected to conductor 310 and adapted to supply medium voltage users such as for example factories; and a PMU 351 connected to the output of said capacitive voltage presence insulator 320.

Furthermore, again with respect to the pre-existing system of FIG. 1, the system object of the present invention, as an additional component, also comprises a receiving_processing unit UR, suitable for receiving and processing the data transmitted by the first PMU 17 located in the primary substation CP and the data transmitted by the second PMU 151/251/351 located in the secondary substation CS.100 or CS.200 or CS.300.

If desirable or necessary, it is also possible to provide instead of the receiving_processing unit UR two distinct units, a receiving unit and a processing unit connected between them, as well as one or more receiving units and one or more processing units, without departing from the inventive concepts protected by the present invention.

With reference to the system object of the present invention as structurally described above, it can be configured to perform the following operations: s.1a)_by means of the first PMU 17 to detect in the primary substation CP and at certain instant of time the values of the current present at the beginning of the aforementioned first line L1.MT by means of the first current transformer 16 located in the same primary substation CP and transmitting the relative data with the relative instant of time to the receiving_processing unit UR; s.1b)_by means of the first PMU 17 to detect in the primary substation CP and in certain temporal instants which are the same instants of time of the previous point s.1a) the voltage values at the output of the measurement voltage transformer 15 located in the same primary substation CP and transmitting the relative data with relative time references to the receiving_processing unit UR; s.1c)_by means of the second PMU 151/251/351 to detect in the aforementioned secondary substation CS.100/CS.200/CS.300 and in certain instants of time which are the same instants of time of the previous point s.1a) and of the previous point s.1b) the values of the output voltage from said at least one voltage reduction apparatus 120/130/230/320 located in said secondary substation CS.100/CS.200/CS.300 and transmit the relative data with relative time references to the receiving_processing unit UR; s.1d)_by means of said receiving_processing unit UR identify and select from the received data at least a first instant in time in which the value of the current relating to the first line L1.MT detected by the current transformer 16 located in the primary substation CP is lower than a certain first pre-established threshold value; s.1e)_by means of said receiving_processing unit UR to process one or more data received from the same receiving_processing unit UR by the previous operations s.1a) and/or s.1b) and/or s.1c) and relating to said first instant in time.

Again with reference to the system described above, it can be configured to perform the following operations: s.2a)_by means of said receiving_processing unit UR storing the data transmitted by the first PMU 15 and by the second PMU 151/251/351; s.2b)_by means of said receiving_processing unit UR to identify and select from the received data at least a first instant in time in which the value of the current relating to the first line L1.MT detected by the current transformer 16 located in the primary substation CP is lower than a certain first pre-established threshold value; s.2c)_by means of said receiving_processing unit UR identify among the received data the data relating to the output voltage with respect to the voltage measurement transformer 15 located in the primary substation CP in the same first instant in time identified and selected at point s.2b) above; s.2d)_by means of said receiving_processing unit UR to identify among the received data the data relating to the output voltage with respect to said at least one voltage reduction apparatus 120/130/230/320 located in the secondary substation CS.100/CS.200/CS.300 in the same first instant in time identified and selected in the aforementioned point s.2b); s.2e)_by means of said receiving_processing unit UR to process the data identified in previous point s.2c) and in point s.2d) regarding said first instant in time.

Always the system object of the present invention can be configured to perform the following operations: s.2f)_by means of said receiving_processing unit UR to process the data identified in the previous point s.2c) and in the previous point s.2d) regarding to said first instant of time in order to perform a calibration in relation to said at least one voltage reduction device 120/130/230/320 located in the secondary substation CS.100/CS.200/CS.300; and/or preferably perform with the following operation: s.2g)_by means of said receiving_processing unit UR to perform a comparison between at least a first value regarding the output voltage from at least one voltage reduction apparatus 120/130/230/320 located in at least one secondary substation CS.100/CS.200/CS.300 with at least a second value relating to the output voltage from the voltage measurement transformer 15 located in the primary substation CP, in which said first value and said second value regard the same instant in time, as for example in the aforementioned first instant of time.

Again the system object of the present invention can also be configured to perform the following operation: s.3a)_by means of said receiving_processing unit UR process the data received from the receiving_processing unit UR to perform a diagnosis of the distribution grid and/or of pieces of the same distribution grid and/or one or more of the devices connected to it.

With reference to the first predetermined threshold value mentioned in the present description, see in particular the above points s.1d) and s.2b) relating to the current transformer 16, it is preferably equal to zero, or, always preferably, a value such as to have an effect due to the voltage drop on the line due to the current flowing in the line itself, having a negligible entity. This first predetermined current threshold value can be determined for example on the basis of the length of the first line L1.MT.

Example of Application of the System in Relation to the Voltage Reduction Apparatus 130

With reference to the system above described, by way of example, hereinafter is described an example of implementation of the system in relation to the voltage reduction apparatus 130 (MV/LV voltage transformer 130) located in the secondary substation CS.100.

In this context, it should be noted that the same system specified below can also be used in relation to the other voltage reduction devices 120/230/320 located in the same secondary substation CS.100 and/or located in the other secondary substation CS.200 and CS.300 and/or located in other substations if existing.

With reference to the primary substation CP and to the secondary substation CS.100, for the implementation of this example, the system object of the present invention will be configured to perform the following operations: e.s.1a)_by means of the first PMU 17 located in the primary substation CP, to detect at certain instant of time the values of the current present at the beginning of the aforementioned first line L1.MT by means of the first current transformer 16 located in the same primary substation CP and transmitting the relative data with the relative instant of time to the receiving_processing unit UR; e.s.1b)_by means of the first PMU 17 located in the primary substation CP, to detect in certain temporal instants which are the same instants of time of the previous point e.s.1a), the voltage values at the output of the measurement voltage transformer 15 located in the same primary substation CP, and transmitting the relative data with relative time references to the receiving_processing unit UR; e.s.1c)_by means of the second PMU 151 located in the secondary substation CS.100, to detect in certain instants of time which are the same instants of time of the previous point e.s.1a) and of the previous point e.s.1b) the values of the output voltage from said voltage reduction apparatus 130 located in said secondary substation CS.100 connected to said the PMU 151, and transmit the relative data with relative time references to the receiving_processing unit UR; e.s.2a)_by means of the receiving_processing unit UR, memorize the data transmitted by the PMU 17 located in the primary substation CP and by the PMU 151 located in the secondary substation CS.100; e.s.2b)_by means of said receiving_processing unit UR, identify and select, among the received data, at least a first instant in time in which the value of the current relating to the first line L1.MT detected by the current transformer 16 located in the primary substation CP it is lower than a given first predetermined threshold value; e.s.2c)_by means of said receiving_processing unit UR, identify among the received data, the data relating to the output voltage with respect to the voltage measurement transformer 15 located in the primary substation CP at the same first instant of time identified and selected at the previous point e.s.2b); e.s.2d)_by means of said receiving_processing unit UR, identify, among the received data, the data relating to the output voltage with respect to said voltage reduction apparatus 130 located in the secondary substation CS.100 in the same first instant of time identified and selected at point e.s.2b) above; e.s.2e)_by means of said receiving_processing unit UR, process the data identified in the previous point e.s.2c) and in the point e.s.2d) regarding said first instant of time.

With reference to the system described above, it can be configured to perform the following operation: e.s.2f)_by means of said receiving unit UR, processing the data identified in above point e.s.2c) and point e.s.2d) relating to said first instant of time, in order to perform a calibration in relation to said voltage reduction apparatus 130 located in the secondary substation CS.100; and/or, preferably, configuring said system to perform the following operation: e.s.2g)_ by means of said receiving—processing unit UR, performing a comparison between at least a first value regarding to the output voltage from said voltage reduction apparatus 130 located in said secondary substation CS.100 with at least a second value relating to the output voltage from the voltage measurement transformer 15 located in the primary substation CP, in which said first value and said second value are related to the same instant of time, as for example in the above mentioned first instant of time.

If desired, said system can be configured to perform also the following operation: e.s.3a)_by means of said receiver_processor unit UR, process the data received from the receiver_processor unit UR to perform a diagnosis of the voltage reduction apparatus 130.

First Threshold Value in Relation to the Method and to the System

With reference to the above description and examples, in relation to the calibration of one or more voltage reduction devices 120/130/230/320, preferably, the method and/or system described above is particularly efficient when the value of the current relating to the first line L1.MT detected by the current transformer 16 located in the primary substation CP is lower than a given first predetermined threshold value, and, preferably when said first threshold value is equal to zero (optimal value).

With reference to said first threshold value of the current not to be exceeded detected by the current transformer 16, as an example and not as a limitation, it can be determined in correlation with the components that are applied along the line L1.MT and, in any case, this first threshold value must have a measure such as to have an effect due to the voltage drop on the line L1.MT due to the effect of the current flowing in the line M1.MT having a negligible amount.

According to a first form of determination, if the value of said voltage detected by means of the precision TV 15 is equal to 100 kV effective Volt and if in the first secondary substation CS.100 there is a voltage reduction apparatus 130 as a capacitive divider type having the following characteristics, rated voltage 10 kV and accuracy class 0.5 (i.e. maximum ratio error 0.5% of the rated voltage and maximum phase error equal to 0.6 crad in the range 80%-120% of the rated voltage—values in accordance with the reference standard IEC 61869-1), said first threshold value of the current that not to be exceeded will be such as not to cause a voltage drop along the line not exceeding a fraction of the ratio error associated with accuracy class 0.5, i.e. 0.5% of 10 kV=50V rms. It is common among calibration laboratories to consider this fraction of the ratio error variable between 1/3 and 1/5 of the accuracy class, that is, in the example cited, between 0.1% and 0.2% which, in absolute value, corresponds at an interval between 10V and 20V. Therefore, the drop along the line caused by the current must not exceed, for example, 20V. If, according to the tables of the characteristics of the medium voltage cables used on the market, a series resistance of the cable of 0.2 ohm/km is assumed, with reference to 10 km of length the current must be less than 10 A in order not to exceed 20V of drop.

In this context, this first predetermined threshold value is preferably a value such as to have an effect due to the voltage drop on the first line L1.MT having an entity equal to or less than 1/3 of the ratio error associated with the accuracy class of a voltage reduction apparatus, for example 130, to be calibrated. By means of the method and/or system object of the present invention it is possible to perform a diagnosis in relation to the apparatuses which are connected to the same grid, as well as to perform a calibration in relation to the voltage reduction apparatuses, solving the above mentioned problems.

Furthermore, again by means of the method and/or system object of the present invention, it is possible to modify existing grid systems, such as for example the systems illustrated in FIG. 1, in which it is not possible to carry out diagnostics of the devices, in grid systems in which it is possible to carry out the diagnostics of the devices, through the execution of no expensive works about cost for the execution time, as they require the insertion of a few components, as well as no expensive works, as it is not required to modify the pre-existing system, and also no expensive as components to be added, solving the above problems.

The descriptions of the above method and of the above system are given by way of example only and not by way of limitation and, therefore, it is clear that said system and said method may be subject to any changes or variations suggested by the practice and their implement or use and, in any event, within the scope of the following claims, in which this claims form a complementary part for this description.

The invention claimed is:

1. A method of operating a grid for the distribution of electricity comprising:

- a primary substation having
  - a first high voltage conductor;
  - an HV/MV voltage transformer suitable for transforming the high voltage electrical energy coming from said first conductor into medium voltage electrical energy;
  - a second medium voltage conductor as output conductor from said HV/MV voltage transformer;
  - a medium voltage busbar connected to said second medium voltage conductor;
  - one or more medium voltage power distribution lines as output lines from said primary substation and connected to said medium voltage busbar;
  - a voltage measurement transformer connected to the second conductor and for measuring an output voltage from said HV/MV voltage transformer;
  - a first current transformer connected to the first one of the lines of medium voltage in an initial zone of the same first line and able to detect the current at the beginning of the first line of medium voltage; and
  - a first PMU connected to the output of the aforementioned measurement voltage transformer and connected to the output of the said current transformer;
- a secondary substation having
  - at least one third conductor in medium voltage as input conductor in the secondary substation and connected to the first line of said medium voltage power distribution lines;
  - at least one voltage reduction apparatus connected to said third medium voltage input conductor; and
  - a second PMU connected to the output of at least one voltage reduction apparatus in said secondary substation; and
- a receiving processing unit for receiving and processing data transmitted by the first PMU in the primary substation and data transmitted by the second PMU located in the secondary substation,
- the method comprising the steps of:
- 1a) the first PMU in the primary substation and at certain instants of time detecting values of the current at the beginning of the first line by means of the first current transformer located in said primary substation and transmitting the relative data with relative time references to the receiving processing unit;
- 1b) the first PMU in the primary substation and at certain instants of time which are same instant of time of the step a) detecting voltage values at the output of the measurement in the same primary substation and transmitting the relative data with relative instant of time to the receiving processing unit;
- 1c) the second PMU in said secondary substation and at certain instants of time which are the same instants of time of the previous point m.1a) and of the step b) detecting voltage values at the output from said at least one voltage reduction apparatus in said secondary substation and transmitting the relative data with relative instants of time to the receiving processing unit;
- 1d) the receiving processing unit identifying and selecting among the received data at least a first instant in time in which the value of the current relative to the first line detected by the current transformer in the primary substation is lower than a certain first predetermined threshold value; and 1e) processing with the receiving processing unit one or more data received by the the receiving processing unit and regarding said first instant in time.

2. The method according to claim 1, further comprising the steps of:

2a) storing by the receiving processing unit the data transmitted by the first PMU and by the second PMU;

2b) identifying and with the receiving processing unit among the received data at least a first instant in time in which the value of the current relative to the first line detected by the current transformer in the primary substation is lower than a first predetermined threshold value;

2c) identifying with the receiving processing unit among the received data the data relating to the output voltage with respect to the voltage measurement transformer in said primary substation in the same first instant of time identified and selected in above step 2b);

2d) identifying with the receiving processing unit among the received data the data relating to the output voltage with respect to said at least one voltage reduction apparatus in the secondary substation in the same identifies and selected first instant of time of the step 2b);

2e) processing by means of the receiving processing unit the data identified in the step 2c) and step 2d) regarding said first instant of time.

3. The method according to claim 2, further comprising the step of:

2f) processing by the receiving processing unit the data identified in step 2c) and step 2d) regarding said first instant of time in order to perform a calibration in relation to said at least one voltage reduction apparatus located in the secondary substation.

4. The method according to claim 1, further comprising the step of:

2g) receiving processing unit making a comparison between at least a first value regarding to the output voltage from at least one voltage reduction apparatus in the secondary substation with at least a second value relating to the output voltage from the voltage measurement transformer in the primary substation, the first value and the second value relate to the same instant in time.

5. The method according to claim 1, further comprising the step of:

3a) processing by means of the receiving processing unit the data received from the receiving processing unit to perform a diagnosis of the distribution grid and/or pieces of the distribution grid and/or of one or more devices connected to it.

6. The method according to claim 1, wherein the first predetermined threshold value is equal to zero.

7. The method according to claim 1, wherein the first predetermined threshold value is a value such as to have a negligible effect due to the voltage drop on the first line.

8. The method according to claim 1, wherein the first predetermined threshold value is a value such as to have an effect due to the voltage drop on the first line having an value equal to or less than 1/3 of the ratio error associated with the accuracy class of a voltage reduction apparatus to be calibrated.

9. A system relating to a grid for the distribution of electricity and comprising:

a primary substation having a first high voltage conductor;

a HV/MV voltage transformer suitable to transform the high voltage electrical energy coming from said first conductor into medium voltage electrical energy;

a second medium voltage conductor as output conductor from said HV/MV voltage transformer;

a medium voltage busbar connected to said medium voltage conductor; and one or more medium voltage electrical distribution lines connected to said medium voltage busbar, such as output lines from said primary substation;

a secondary substation having at least a third medium voltage input conductor connected to a first line of said electrical distribution lines medium voltage; and at least one voltage reduction apparatus connected to said at least third medium voltage input conductor;

said primary substation further having:

a voltage measurement transformer connected to the second conductor at the output of said HV/MV voltage transformer and able to measure the voltage at the output of said voltage transformer AT/MT;

a first current transformer connected to a first one of the lines of medium voltage in an initial zone of the same first line and able to detect the current at the beginning of the aforementioned first line of medium voltage;

a first PMU connected to the output of said measurement voltage transformer and connected to the output of the current transformer;

a second PMU in the secondary substation and connected to the output of said at least one voltage reduction apparatus in said secondary substation; and a receiving processing unit able to receive and process the data transmitted by the first PMU in the primary substation and the data transmitted by the second PMU in the secondary substation; the system being configured to perform the following steps:

1a) the first PMU detecting in the primary substation and at certain instant of time the values of the current at the beginning of the first line by means of the first current transformer in the same primary substation and transmitting the relative data with relevant time references to the receiving processing unit;

1b) the first PMU detecting in the primary substation and in certain temporal instants which are the same instants of time of the step 1a) the voltage values at the output of the measurement voltage transformer in the same primary substation and transmitting the relative data with relative time references to the receiving processing unit;

1c) the second PMU detecting in the secondary substation and in certain instants of time which are the same instants of time of the step 1a) and of the step 1b) the values of the output voltage from said at least one voltage reduction apparatus in said secondary substation and transmitting the relative data with relative time references to the receiving processing unit;

1d) the receiving processing unit identifying and selecting from the received data at least a first instant in time in which the value of the current relating to the first line detected by the current transformer in the primary substation is lower than a certain first pre-established threshold value;

1e) the receiving processing unit to processing one or more data received from the receiving processing unit and relating to said first instant in time.

10. The system according to claim 9, the system is configured to perform the following steps:

2a) the receiving processing unit storing the data transmitted by the first PMU and by the second;

2b) the receiving processing unit to identifying and selecting from the received data at least a first instant in time in which the value of the current relating to the first line detected by the current transformer in the primary substation is lower than a certain first pre-established threshold value;

2c) the receiving processing unit identifying among the received data the data relating to the output voltage with respect to the voltage measurement transformer in the primary substation in the same first instant in time identified and selected in step 2b);

2d) the receiving processing unit to identifying among the received data the data relating to the output voltage with respect to said at least one voltage reduction apparatus in the secondary substation in the same first instant in time identified and selected in the step 2b);

2e) the receiving processing unit to processing the data identified in step 2c) and in the step 2d) regarding said first instant in time.

11. The system according to claim 10, wherein the system is configured to perform the following step:

2f) the receiving processing unit processing the data identified in the step 2c) and in the step 2d) regarding to said first instant of time in order to perform a calibration in relation to said at least one voltage reduction device in the secondary substation.

12. The system according to claim 9, wherein said system is configured to perform the following step:

2g) the receiving processing unit performing a comparison between at least a first value afferent to the output voltage from at least one voltage reduction apparatus in at least one secondary substation with at least a second value relating to the output voltage from the voltage measurement transformer in the primary substation, the first value and said second value regarding the same instant in time.

13. The system according to claim 9, wherein the system is configured to perform the following step:

3a) the receiving processing unit processing the data received from the receiving processing unit to perform a diagnosis of the distribution grid and/or of pieces of the same distribution grid and/or one or more of the devices connected to it.

14. The system according to claim 9, wherein the first predetermined threshold value is equal to zero.

15. The system according to claim 9, wherein the first predetermined threshold value is a value such as to have a negligible effect due to the voltage drop on the first line.

16. The system according to claim 9, wherein the first predetermined threshold value is a value such as to have an effect due to the voltage drop on the first line having a value equal to or less than 1/3 of the ratio error associated with the accuracy class of a voltage reduction apparatus to be calibrated.

* * * * *